United States Patent [19]
Alelyunas et al.

[11] Patent Number: 6,111,920
[45] Date of Patent: Aug. 29, 2000

[54] METHOD AND SYSTEM FOR TIMING RECOVERY IN A BAUD-RATE SAMPLED DATA STREAM

[75] Inventors: Carl H. Alelyunas; Andrew L. Norrell, both of Nevada City, Calif.

[73] Assignee: 3Com Corporation, Santa Clara, Calif.

[21] Appl. No.: 08/980,027

[22] Filed: Nov. 26, 1997

[51] Int. Cl.[7] .................... H04L 27/14; H04L 27/16; H04L 27/22

[52] U.S. Cl. .................... 375/326; 375/349; 375/350; 375/355

[58] Field of Search .................... 375/222, 377, 375/326, 243, 259, 260, 286, 316, 346, 349, 350, 229, 355, 362, 344, 345, 232; 364/723, 724.011; 708/290, 314

[56] References Cited

U.S. PATENT DOCUMENTS

| | | |
|---|---|---|
| 4,896,336 | 1/1990 | Henely et al. . |
| 5,040,192 | 8/1991 | Tjahjadi . |
| 5,249,578 | 10/1993 | Karp et al. .......................... 128/661.01 |
| 5,263,054 | 11/1993 | Davis et al. . |
| 5,742,622 | 4/1998 | Claydon et al. .......................... 371/46 |

OTHER PUBLICATIONS

Bergmans, Jan W.M., *Digital Baseband Transmission and Recording*, Dordrecht: Kluwer Academic Publishers, 1996, pp.533–535.

*Primary Examiner*—Tesfaldet Bocure
*Assistant Examiner*—Jean B Corrielus
*Attorney, Agent, or Firm*—McDonnell Boehnen Hulbert & Berghoff

[57] ABSTRACT

Decision-based timing information extraction from a baud-rate sampled digital transmission system. Samples are interpolated from a data sample stream to obtain samples shifted forward and backward in time. A timing metric is applied to the forward and backward shifted sample stream to create forward and backward timing metric values. A timing recovery metric is applied to the forward and backward timing metric values, and is used as a phase feedback term to recover timing information. The method and system yield a very fast, data-driven convergence for baud-rate timing, and does not rely on any specific data sequence. The method and system are used in digital communication devices such as digital modems.

24 Claims, 3 Drawing Sheets

METHOD AND SYSTEM FOR TIMING RECOVERY IN A BAUD-RATE SAMPLED DATA STREAM

BACKGROUND OF THE INVENTION

A. Field of Invention

The present invention relates to digital communication systems. More specifically, it relates to timing recovery in a baud-rate sampled communication system.

B. Background of the Invention

Communication devices such as modems establish connections at a data rate that is predetermined, or one that is negotiated during an initialization stage. A data rate is typically measured in bits-per-second ("bps"). The number of bits per second is related to the type of signaling, or encoding, that is used to convey the information, and the number of times per second that the transmitted signal changes its value. The number of signal variations per second is called a "baud rate." If the transmitted signal represents one data bit, only two states are needed (e.g., 0 or 1). During the baud time, these states may be represented as one of two voltage levels, two frequencies, varied carrier phases, or other well-known signaling formats. In the case where each baud represents one bit, the terms "baud" and "bps" are equivalent. However, if a signaling element is chosen from a set of elements having more than two elements, it can be used to convey more than one bit of information. For example, in a signal set having four levels, each level may represent 2-bits of information. In this scenario, the signal transmitted during each baud time represents two bits. Thus the bit rate is twice the baud rate. The term "symbol," rather than "baud" is often used to refer to signaling elements.

Several different encoding methods are used to encode signals on a communication device such as a modem. The encoding schemes include Frequency Shift Keying ("FSK"), also called frequency modulation, Amplitude Shift Keying ("ASK"), also called amplitude modulation, Phase Shift Keying ("PSK") also called phase modulation, and Phase and Amplitude Modulation ("PAM"). If a signal's phase shift is measured relative to a previous signal, Differential Phase Shift Keying ("DPSK") may be used where n-bits can be assigned to a signal having one of $2^n$ phase shifts where the bit rate is n-times the baud rate. For more information see *Understanding Data Communications and Networks*, by William A. Shay, PWS Publishing Company, Boston, Mass., 1995.

Communication devices such as modems adhere to communication standards that define a baud rate, a bit rate and a modulation scheme. The International Telecommunications Union-Telecommunication Standardization Sector ("ITU-T", formerly known as the CCITT) define standards for communication devices operating over the telephone network, identified by "V.xx" series where "xx" is an identifying number. For example, the ITU-T V.26 defines a communication standard for a baud rate of 1200 baud, a bit rate of 2400 bps and a modulation technique of PSK. A communication device typically contacts another communication device, exchanges signals according to predefined protocols, and then utilizes the appropriate standard for communicating.

When a communication device negotiates a standard for communications, the device is expected to adhere to the standard it negotiated during the communication. For example, if a first communication device negotiates to use V.26 to communicate with a second communication device, then the communication device should use a baud rate of 1200 baud, a bit rate of 2400 bps and a PSK modulation technique to send data.

If a transmitter and receiver do not utilize a common timing reference to demarcate baud intervals, then the receiver typically attempts to recover baud timing information from the received data signal. The received signal may be a baseband voltage waveform directly representing the logical values, or may be a modulated carrier wave, or other form of modulation such as wavelets. When the analog signal arrives at the receiving location, it is often sampled, and processed digitally in order to recover the data carried within the received analog signal. The received signal may be sampled at an interval that results in numerous samples per baud period, but at a minimum, must be sampled at least once per symbol.

As is known in the art, a signal is a time-continuous signal within a time range t if its amplitude is specified for all value of t in that range. If a time-continuous signal is "discretized," that is, if t if represented by a set of discrete values denoted by $t_k$, where k takes on positive integer values, the signal is defined only at discrete-time instants known as "sampling instants." Signals which are defined only at discrete instants of time are called "discrete-time" or "discrete signals" and are represented by a sequence of numbers. The samples are generally equally-spaced in time. If the spacing is denoted by an arbitrary constant T, the discrete signal can be expressed by x(kT) or x(k), where k represents discrete time and T is the sampling interval, or sampling period.

SUMMARY OF THE INVENTION

In accordance with an illustrative embodiment of the present invention, a method and system are presented for timing recovery in a baud-rate sampled data stream. The method and system include a digital transmission system with a data stream sampled at the receiver with a sampling interval T. The sampled data stream includes multiple sample values. The sample values from the data stream are used to interpolate a sample representing a first offset sample. This interpolated offset sample is an estimate of a sample that would have been obtained by actually sampling the received signal at that point in time. The first offset sample is shifted forward in time. The sample values are also used to interpolate a second offset value that is shifted backward in time. Timing metrics are applied to the first and second offset values to create first and second metric values. These metric values are measures of the accuracy of the interpolated samples as being representative of an estimated received baud value. A timing recovery metric is applied to the first and second metric values to create a timing recovery value, which is applied as a feedback value for baud-rate timing recovery. The method and system yield a very fast, data-driven convergence of baud-rate timing and does not rely upon, nor is limited to any specific data sequence.

The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Figure 1:
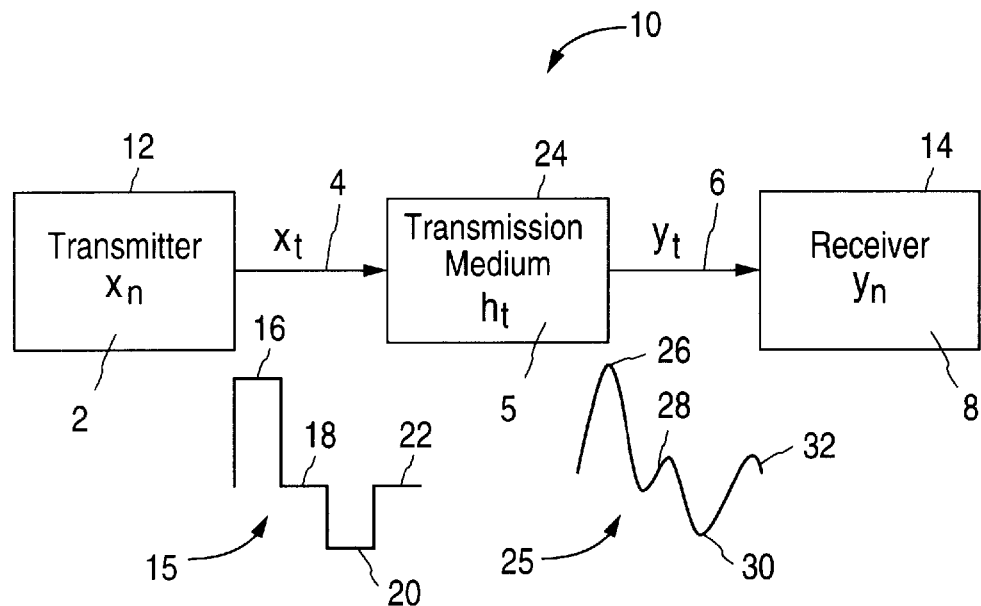
FIG. 1 is a block diagram of a first transmission system used to implement an illustrative embodiment of the present invention.

FIG. 1 is a block diagram of a transmission system 10 used to implement an illustrative embodiment of the present invention. Transmission system 10 sends information bits through a transmitter 12 to receiver 14. The transmission system 10 may also have full duplex devices, in which case devices 12 and 14 would be full duplex transceivers, each having a transmitter and receiver component. Without loss of generality, the simplex circuit of FIG. 1 is discussed herein. The information bauds are generally represented by the symbol "x". Within transmitter 12, the bauds $x_n$ 2 are discrete time signals that are transformed into a continuous time signal $x_t$ 4 by a digital-to-analog (D/A) converter (not shown). The continuous time signal $x_t$ 4 is transmitted over communication medium 24 having channel impulse response $h_t$ 5. Transmission medium 24 transforms the signal to $y_t$ 6, which is a distorted version of $x_t$ 4. The signal $y_t$ 6 is received at receiver 14 where it is sampled at the baud rate thereby generating $y_n$ 8.

An operating environment for transmitter 12 (as well as receiver 14) includes a processing system, preferably having at least one high speed Central Processing Unit (CPU), in conjunction with a memory system. These elements are typically interconnected by a bus structure. The CPU is of familiar design and any of a variety of processors, including those from Texas Instruments, Digital Equipment, Sun, MIPS, IBM, Motorola, NEC, Intel, Cyrix, AMD, Nexgen and others are equally preferred for CPU. Although described with one CPU, alternatively multiple CPUs may be used. The memory system includes main memory and secondary storage. The main memory is high-speed random access memory (RAM) and read only memory (ROM). Main memory can include any additional or alternative high-speed memory device or memory circuitry. Secondary storage takes the form of long term storage, such as ROM, optical or magnetic disks, organic memory or any other volatile or non-volatile mass storage system. Those skilled in the art will recognize that the memory system can comprise a variety and/or combination of alternative components.

The data bits are typically provided from terminal equipment (not shown) such as a digital computer. The data bits may be maintained on a computer readable medium including magnetic disks, optical disks, and any other volatile or non-volatile mass storage system readable by the computer. The computer readable medium includes cooperating or interconnected computer readable media, which exist exclusively on the processing system or may be distributed among multiple interconnected processing systems that may be local or remote to processing system, and accessible over a network.

Figure 2:
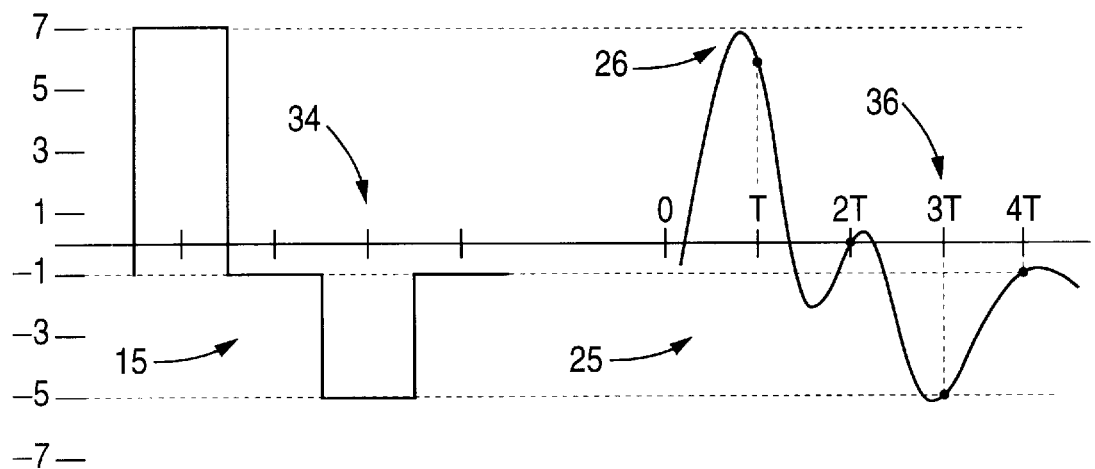
FIG. 2 is a depiction of transmitted and received signals in the system of FIG. 1.

Returning to FIG. 1, transmitter 12 produces a signal $x_n$ and converts it to a continuous time signal $x_t$ 15 (a typical signal corresponding to signal $x_t$ 4) having a plurality of signals 16, 18, 20, 22 at a given baud rate with varying amplitudes. In the example shown in FIGS. 1 and 2, each symbol 16–22 is selected from the set of eight possibilities {±1, ±3, ±5, ±7}, and therefore, each symbol represents three bits. The particular sequence $x_n$ depicted in FIGS. 1, and 2 is 7, −1, −5, −1. The baud rate used to create signal $x_t$ 15 is typically negotiated with a receiver 14 in accordance with a standard protocol recognized by both the transmitter 12 and receiver 14. Receiver 14 thereafter expects transmitter 12 to transmit information at the negotiated baud-rate.

Signal 15 is transmitted over a transmission medium 24 that may be, e.g., fiber optic cable, copper wire, or a wireless communication system. Receiver 14 receives signal $y_t$ 25 (a typical portion of signal $y_t$ 6), having signal components 26, 28, 30, 32, and recovers the information data bits from the symbols 26–32. Transmitter 12 and receiver 14 may be components of digital modems capable of both transmitting and receiving signal components 16–22, or other analog or digital communication devices (e.g., a T1 card, a DS1 card, etc.). The baud-rate signal $x_t$ 15 may have been modulated onto a carrier signal to create a bandpass signal for transmission through the medium 24, and then demodulated within receiver 14 to recover baseband signal $y_t$ 25. The demodulation would typically occur in an analog portion of the receiver prior to sampling the signal because the sampling occurs at the baud rate. Performing demodulation after sampling would require oversampling the received signal at a rate of two, three (or more) times the baud rate (i.e., a rate of 2/T, 3/T, etc., where T is the baud period). If such oversampling is performed, then alternative methods of timing recovery may be used such as utilizing timing information extracted from the bandedges of the received signal.

Ideally, receiver 14 receives signal components that are identical to the transmitted signal components 16–22 and recovers the information data bits without error. However signal components 16–22 may be altered or corrupted by numerous characteristics of transmission medium 24. Noise, bandlimiting, nonlinearities, multipath, fading, as well as other well-known factors associated with transmission medium 24 cause signal distortion in the received signal $y_t$ 25 as is illustrated by a comparison of signal components 26–32 with signal components 16–22. In a baud-rate sampled system, the signal $y_t$ 25 is sampled to generate $y_n$. Each sample represents one received baud or symbol. The signal is not oversampled. In such a system, it is desirable to determine the time instant within the baud period where the received signal most closely matches the transmitted amplitude and to choose that point as the sampling instant. Typically, this is located near the center of the baud.

FIG. 2 shows the original data signal 15 on the left side, and the received signal 25 on the right side. Note that the signal 15 is representative of the data symbols to be transmitted, and may actually be processed further by transmitter 12 before being sent to the transmission medium 24. For example, signal 15 is a baseband signal that may be modulated onto a carrier frequency, or it may be low-passed filtered to limit its frequency content, or both. The center of the transmit baud periods are indicated by hash marks 34 on the horizontal time axis. The received signal 25 is depicted in relation to the receiver baud-rate timing, having period T, as indicated by the hash marks 36.

Figure 3:
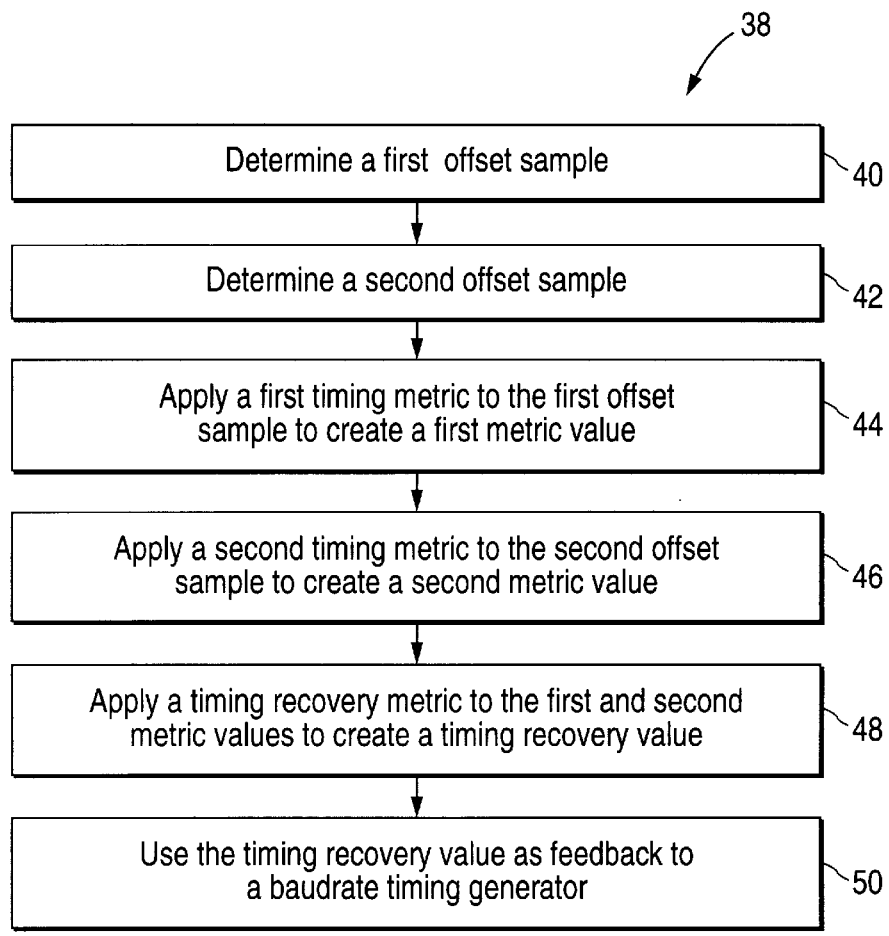
FIG. 3 is a flow diagram illustrating a method for timing recovery in a baud-rate sampled system.

FIG. 3 is a flow diagram illustrating a method 38 for timing recovery in a baud-rate sampled system. The receiver 14 shown in FIG. 1 has a data stream sampled with a sampling interval T. The sampled data stream includes multiple sample values of the received signal 25. The sample values are obtained from an analog to digital converter, typically located within receiver 14, and each sample consists of multiple bits. A physical structure for storing and shifting a time-sequence of samples is often referred to as a tap-delay line. The tap-delay line is a serially connected string of memory elements where the samples are passed from one element to the next at a given clock rate. The delay line may be implemented by a microprocessor, where the sequence of sample values is typically stored in memory (e.g., such as a buffer or register within a memory chip or microprocessor), and operated upon, as is well known in the art, within a microprocessor.

At step 40 the sample values from the data stream are obtained from the tap-delay line and are used to generate a first offset value. At step 42 the sample values are shifted backward in time to create a second offset value. The offset values are preferably generated from the sample sequence by an interpolation process.

A first timing metric is applied to the first offset value to create a first metric value at step 44. A second timing metric is applied to the second timing value to create a second metric value at step 46. At step 48, a timing recovery metric is applied to the first and second metric values to create a timing recovery value. The timing recovery value is applied as a feedback value for baud-rate timing recovery at step 50. Method 38 yields a very fast, data-driven convergence of baud-rate timing and does not rely on, nor is limited to any specific data sequence.

Figure 4A:
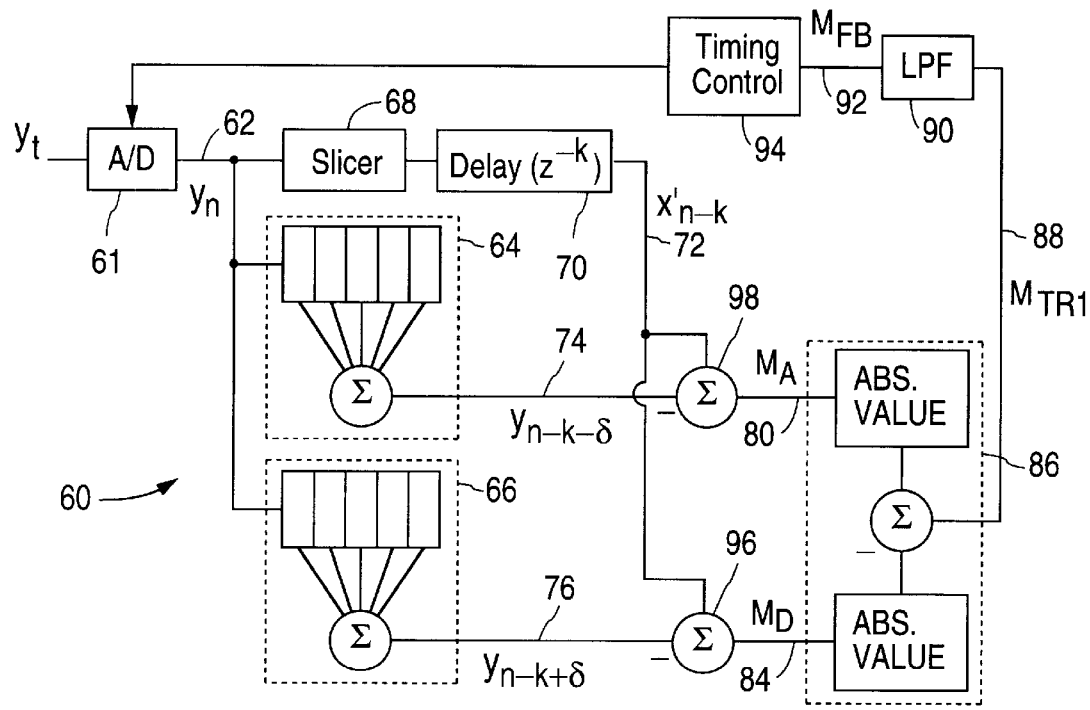
FIGS. 4A and 4B are block diagrams illustrating a first and a second baud-rate timing recovery system with a first and second timing recovery metric.
Figure 4B:
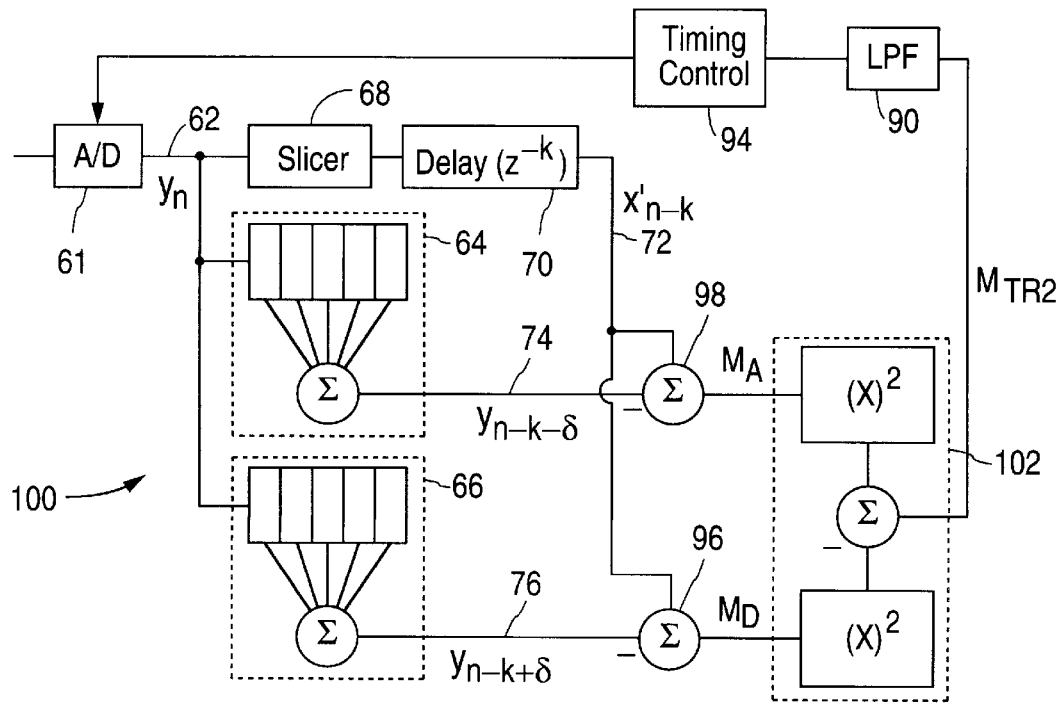

FIGS. 4A and 4B are block diagrams illustrating a first and second baud-rate timing recovery systems with a first and second timing recovery metric. As is shown in FIG. 4A, a first baud-rate timing recovery system 60 is illustrated. A signal $y_t$ is sampled by A/D converter 61 thereby generating a data stream $y_n$ 62. Sample stream $y_n$ 62 is presented to a first FIR filter 64 and a second FIR filter 66. The FIR filters 64, 66 generate time-skewed samples $y_{n\pm\delta}$ from sample stream $y_n$ 62, where $\delta$ represents a fraction of a sampling interval.

As is known in the signal processing arts, a digital filter can be represented by a $n^{th}$ order difference equation shown in Equation 1.

$$y(k) = \sum_{i=0}^{n} a_i x(k-i) - \sum_{i=1}^{n} b_i y(k-i) \tag{1}$$

where x is the input, and y is the output. If at least one $a_i$ and one $b_i$ coefficients are nonzero in Equation 1, the digital filter is said to be a "recursive" filter. In a recursive filter, the present value of the output y(k) depends both on the present and previous values of the input as well as on previous values of the output. If all the $b_i$ coefficients are zero, then the digital filter is said to be a "nonrecursive" filter. In a nonrecursive filter, the output depends only on the present and past values of the input.

A digital filter whose impulse response is of finite duration is called a Finite Impulse Response ("FIR") filter. A FIR digital filter is usually implemented by a nonrecursive structure and can be represented by the difference equation shown in Equation 2:

$$y(k) = \sum_{i=0}^{n} a_i x(k-i) \tag{2}$$

where y(k) represents the filter output at time t=kT, $a_i$ represents the filter coefficients, and x(k−i) are the inputs at times (k−i)T for i=0, 1, 2, . . . n−1. It should be noted that equations 1 and 2 are general forms of difference equations, and that in the embodiment of FIGS. 4A and 4B, the inputs to the FIR filters are labeled as y(n), and the outputs are labeled as y'(n), which are time shifted estimates of y(n). For more information on FIR filters see *"Discrete-Time Signal Processing"* by Alan V. Oppenheim and Ronald W. Schafer, Prentice Hall Inc., New Jersey (1989).

Returning to FIG. 4A, the coefficients $a_i$ from Equation 2 chosen for FIR filters 64, 66 are shown in Equation 3. However, other coefficients $a_i$ could also be used.

$$a_i = \sin(\pi(iT\pm\Delta t))/(\pi(iT\pm\Delta t)) \tag{3}$$

In Equation 3, T is the sampling interval (also the inverse baud rate), k is the length of the FIR filter, i varies from −k to +k, and $\Delta t$ is the time the sample value is offset in units of fractions of T, i.e., $\Delta t = \delta T$. Note that the coefficients for filter 64 are generated using the +$\Delta t$ term, while the coefficients for filter 66 are generated using the −$\Delta t$ term. In one exemplary embodiment of the present invention, k=4, i varies from −4 to +4, and $\Delta t = 0.01T$ for a given sampling interval (baud rate) of T. However, other values for k, i and $\Delta t$ could also be used.

FIR filters operate on a predetermined number of input samples considered to be a data window. The data window of the preferred embodiment has an odd number of points, 2k+1, having k data points before the middle point (i.e., −k) and k data points after the middle point (i.e. +k). Thus, the digital filter has a transient response that lasts at least (2k+1) sampling periods. In an illustrative embodiment of the present invention, FIR filters (64,66) are odd length FIR filters with a length of (2k+1).

First FIR filter 64 with coefficients $a_i$ of $\sin(\pi(nT+\Delta t))/(\pi(nT+\Delta t))$ generates an estimated sample value shifted forward in time. The output 74 is thus an estimate of what the A/D converter 61 would have produced if the sampling instant had been delayed by $\Delta t$ seconds. Note that the output is only an estimate due to the fact that FIR filters 64 and 66 do not implement ideal reconstruction, but instead use a truncated, or windowed, sinc function to perform the interpolation. Second FIR filter 66 with coefficients $a_i$ of $\sin(\pi(nT-\Delta t))/(\pi(nT-\Delta t))$ generates a sample value shifted backward in time. The output 76 is thus an estimate of what the A/D converter 61 would have produced if the sampling instant had been advanced by $\Delta t$ seconds. The coefficients of FIR filters 64 and 66 are therefore sinc functions that have been windowed by a rectangular window. The process of interpolation is well known in the art of digital signal processing, and may be accomplished using a number of alternative filtering techniques. Such techniques include LaGrange interpolation, binomial interpolation, linear interpolation, and sinc functions windowed by Hamming, Hanning, triangular, etc. windows.

In another part of system 60, a slicer 68 extracts a sample value from sample stream $y_n$ 62 and provides an output $x'_n$ that corresponds to the symbol level that is closest to the sample $y_n$. With no distortion or attenuation of any type (e.g., ht=$\delta(t)$, the dirac delta function), the samples $y_n$ would correspond exactly to a symbol level. Delayer 70 delays the symbol estimate $x'_n$ by k time increments (represented by $z^{-k}$) to create a delayed symbol estimate $x'_{n-k}$. This delay is provided to account for the delay associated with generating the offset samples in FIR filters 64 and 66. The outputs 74 and 76 of FIR filters 64 and 66 are compared to the delayed ideal symbol value 72.

A first timing metric is the difference between the sliced and delayed value 72 and output 74 of first FIR filter 64. The first timing metric creates a first timing metric value $M_A$ 80. A second timing metric is the difference between value 72 and output 76 of second FIR filter 66 and is used to create a second timing metric value $M_D$ 84. A first timing recovery metric 86 is applied to first and second timing metric values $M_A$ $M_D$ to create a first timing recovery value $M_{TR1}$ 88. First timing recovery metric $M_{TR1}$ 88 is the difference of an absolute value of first timing metric value $M_A$ 80 and an absolute value of second timing metric value $M_D$ 84. However, other timing metrics could also be applied (See FIG. 4B).

First timing recovery value $M_{TR1}$ 88 is optionally filtered with a Low Pass Filter ("LPF") 90 to create a feedback value $M_{FB}$ 92 to timing control unit 94. As is known in the art, a low pass filter passes inputs less than a cutoff magnitude and rejects inputs greater than the cutoff magnitude. Since any decision errors that occur in slicer unit 68 will cause erroneous timing information to be generated, feedback term $M_{FB}$ 92 is preferably filtered to obtain the low-frequency components. These low frequency components contain a longer-term average of the timing information. In an illustrative embodiment of the present invention, feedback value 92 is used as a phase feedback term to adjust the timing control unit 94, which adjusts the sampling instant of A/D converter 61.

Figure 5:
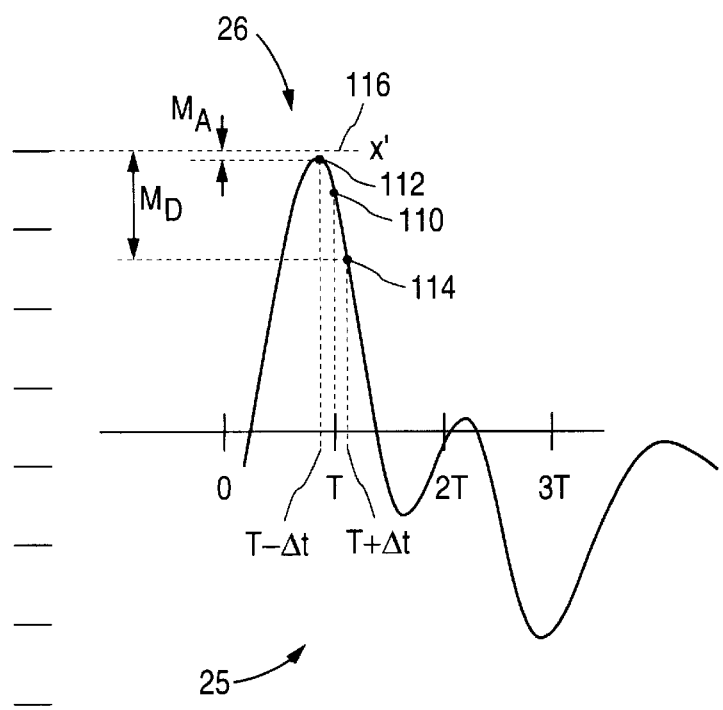
FIG. 5 is a diagram illustrating the interpolation and timing metric value generation.

FIG. 5 depicts the sample 110 obtained from A/D converter 61 at time T. The FIR filters 64, 66, respectively, generate offset sample estimates 112 at T−Δt, and 114 at T+Δt. The filtering and interpolation operations are performed strictly on the sampled signals. Thus, the continuous-time waveform 25 is shown for reference purposes only. Slicer 68 uses sample 110 to generate an estimate x' 116 of the transmitted symbol. First and second timing metrics generate the timing metric values $M_A$ and $M_D$.

FIG. 4B shows a second baud-rate recovery system 100 of the present invention. First timing recovery metric 86 (FIG. 4A) is replaced by second timing recovery metric 102. Second timing recovery metric 102 calculates a difference between the square of the first timing metric value 80 and the square of the second timing metric value 84.

Method 38 (FIG. 2) is illustrated using system 60 (FIG. 4A). Offset values are determined in steps 40 and 42 by FIR filters 64 and 66. The application of first and second timing metrics of steps 44 and 46 are performed in summers 96 and 98 by calculating the difference between an ideal sliced value and offset sample values obtained from FIR filters 64 and 66. The timing recovery metric is applied by metric 86 (or metric 102) to create a timing recovery value 88. The timing recovery value is then used to adjust the timing control unit 94.

In one embodiment of the present invention, method 38, system 60 and system 100 are implemented as software instructions in a digital communication device such as a digital modem. However, the present invention is not limited to software instructions in a digital modem, and any combination of software and hardware may be used. For example systems 60 and 100 may be implemented as hardware components.

In one specific embodiment of the present invention, first or second digital communication devices 12, 14 are digital modems by 3Com Corporation of California or digital modems used in a "Total Control Telephony Chassis" by 3Com. The Total Control Telephony Chassis includes multiple network interface cards connected by a common bus. See "Modem Input/Output Processing Techniques", U.S. Pat. No. 5,528,595, granted to Dale M. Walsh et al., the text of which is incorporated herein by reference, for more information on the U.S. Robotics Telephony Chassis. However, the present invention is not limited to U.S. Robot-ics to digital modems or use in the U.S. Robotics Total Control Telephony Chassis.

It should be understood that the programs, processes, methods and apparatus described herein are not related or limited to any particular type of computer apparatus (hardware or software), unless indicated otherwise. Various types of general purpose or specialized computer apparatus may be used with or perform operations in accordance with the teachings described herein. In accordance with the practices of persons skilled in the art of computer programming, the present invention has been described herein with reference to acts and symbolic representations of operations that are performed by a processing system, unless indicated otherwise. Such acts and operations are sometimes referred to as being computer-executed. Persons of ordinary skill in the art will appreciate that the acts and symbolically represented operations include the manipulation of electrical signals by the CPU. The electrical system represents programming information that cause a resulting transformation or reduction of the electrical signal representation of, for example, digital data. The manipulation of data bits at memory locations in the memory system further reconfigures or otherwise alters the processing system's operation, as well as other processing of other data signals. The memory locations where program and data bits are maintained are physical locations that have particular electrical, magnetic, optical, or organic properties corresponding to the bits.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

The claims should not be read as limited to the described order or elements unless stated to that effect. Therefore, all embodiments that come within the scope and spirit of the following claims and equivalents thereto are claimed as the invention.

We claim:

1. In a digital transmission system having a data stream sampled with a sampling interval T, the sampled data stream having a plurality of sample values, the sample values having a plurality of sample bits, a method of baud-rate timing recovery, the method comprising the following steps:

interpolating the sample values from the data stream to create a first offset values forward in time from said sample value;

interpolating the sample values from the data stream to create a second offset values backward in time from said sample value;

applying a first timing metric to the first offset value to create a first metric value;

applying a second timing metric to the second offset value to create a second metric value;

applying a timing recovery metric to the first and second metric values to create a timing recovery value; and applying the timing recovery value as a feedback value for baud-rate timing recovery.

2. A computer readable medium having stored therein instructions for causing a central processing unit in the digital transmission system to execute the method of claim 1.

3. The method of claim 1 further comprising:

filtering the timing recovery value before using it as the feedback value.

4. The method of claim 3 wherein the filtering step includes filtering the timing recovery value with a low pass filter.

5. The method of claim 1 wherein the step of interpolating the sample values from the data stream to create a first offset value includes filtering the plurality of sample values with a FIR filter having coefficients derived from a truncated offset sinc function.

6. The method of claim 5 wherein the truncated offset sinc function is represented by $\sin(\pi(nT+\Delta t))/(\pi(nT+\Delta t))$, where T is the sampling interval, where 2k+1 is the length of the FIR filter, n varies from −k to +k, k is a positive interger and $\Delta t$ is the time offset of the first offset value.

7. The method of claim 1 wherein the step of interpolating the sample values from the data stream to create a second offset value includes filtering the plurality of sample values with a FIR filter having coefficients derived from a truncated offset sinc function.

8. The method of claim 7 wherein the truncated offset sinc function is represented by $\sin(\pi(nT-\Delta t))/(\pi(nT-\Delta t))$, where T is the sampling interval, where 2k+1 is the length of the FIR filter, n varies from −k to +k, k is a positive interger and $\Delta t$ is the time offset of the second offset value.

9. The method of claim 1 wherein the step of applying a first timing metric includes determining a difference between an ideal value and the first offset value.

10. The method of claim 9 wherein the ideal sample value is a value from the data stream quantized to the number of discrete levels in an encoding scheme used to transmit the data stream.

11. The method of claim 1 wherein the step of applying a timing recovery metric to the first and second metric values to create a timing recovery value includes determining a difference between an absolute value of the first metric value and an absolute value of the second metric value.

12. The method of claim 1 wherein the step of applying a first timing metric to the first offset value includes squaring a difference between the first offset value and an ideal value.

13. The method of claim 1 wherein the feedback value is a phase feedback value.

14. The method of claim 1 wherein the step of applying a timing recovery metric to the first and second metric values to create a timing recovery value includes determining a difference between a squared value of the first metric value and a squared value of the second metric value.

15. The method of claim 1 wherein the step of interpolating the sample values to create a first offset value includes filtering the plurality of samples values with a recursive filter.

16. A timing recovery apparatus for use in a digital modem for processing a data stream, comprising:

a first interpolation filter operating on sample values from the data stream to create a first offset value forward in time;

a second interpolation filter operating on sample values from the data stream to create a second offset value backward in time;

first difference means for determining a difference between an ideal value and the first offset value to create a first metric value;

second difference means for determining a difference between an ideal value and the second offset value to create a second metric value;

timing recovery means for applying a timing recovery metric to the first and second metric values to create a timing recovery value; and feedback means for applying the timing recovery value as a feedback value for baud-rate timing recovery.

17. The timing recovery apparatus of claim 16 further comprising:

a filter for low pass filtering the timing recovery value to create a filtered timing recovery value.

18. The timing recovery apparatus of claim 16 wherein first and second interpolation filters include finite impulse response filters.

19. The timing recovery circuit of claim 16 wherein the timing recovery means includes difference means for determining a difference between an absolute value of the first metric value and an absolute value for the second metric value to create the timing recovery value.

20. The digital modem of claim 16 further including a first and second squaring means for squaring of the first and second metric values.

21. In a digital modem for processing a data stream, a method of baud-rate timing recovery, the method comprising the following steps:

interpolating sample values from the data stream with a first finite impulse response filter to create a first offset value forward in time;

interpolating sample values from the data stream with a second finite impulse response filter to create a second offset value backward in time;

determining a first difference between an ideal sample value and the first offset value, wherein the ideal sample value is a sample value from the data stream quantized to the number of discrete levels used for data values in the data stream;

determining a second difference between the ideal sample value and the second offset value;

applying a timing recovery metric to the first and second differences to create a timing recovery value;

filtering the timing recovery value with a low pass filter to create a filtered timing recovery value; and applying the filtered timing recovery value as a phase feedback value for baud-rate timing recovery.

22. A computer readable medium having stored therein instructions for causing a central processing unit in the digital modem to execute the method of claim 21.

23. The method of claim 21 wherein the step of applying a timing recovery metric to the first and second differences to create a timing recovery value includes determining a difference between an absolute value of the first difference and an absolute value of the second difference.

24. The method of claim 21 wherein the step of applying a timing recovery metric to the first and second differences to create a timing recovery value includes determining a difference between a square of the first difference and a square of the second difference.

* * * * *